United States Patent
Kwa et al.

(10) Patent No.: US 10,614,777 B2
(45) Date of Patent: Apr. 7, 2020

(54) METHODS AND APPARATUS FOR SYNCHRONIZING EMBEDDED DISPLAY PANELS OF MOBILE DEVICES VIA PROGRAMMABLE SYNCHRONIZATION LINKS

(71) Applicant: Intel Corporation, Santa Clara, CA (US)

(72) Inventors: Seh Kwa, Saratoga, CA (US);
Nausheen Ansari, Folsom, CA (US);
Nobuyuki Suzuki, Portland, OR (US);
Zhiming Zhuang, Sammamish, WA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/144,346

(22) Filed: Sep. 27, 2018

(65) Prior Publication Data
US 2019/0043450 A1 Feb. 7, 2019

(51) Int. Cl.
*G09G 5/12* (2006.01)
*G06F 3/14* (2006.01)
*G06F 1/16* (2006.01)

(52) U.S. Cl.
CPC ............ *G09G 5/12* (2013.01); *G06F 1/1647* (2013.01); *G06F 3/1446* (2013.01); *G09G 2300/026* (2013.01)

(58) Field of Classification Search
CPC .......... G06F 1/1647–165; G06F 3/1423–1446; G09G 5/12; G09G 2300/026
See application file for complete search history.

(56) References Cited

U.S. PATENT DOCUMENTS

| | | | | |
|---|---|---|---|---|
| 6,046,709 A | * | 4/2000 | Shelton | G06F 3/1446 345/1.1 |
| 6,646,645 B2 | * | 11/2003 | Simmonds | G06F 3/1438 345/502 |
| RE40,741 E | * | 6/2009 | Simmonds | G06F 3/1438 345/502 |
| 9,086,838 B2 | * | 7/2015 | Panvelwala | G06F 3/1446 |
| 9,696,958 B2 | * | 7/2017 | Choi | G06F 3/1446 |
| 9,947,290 B2 | * | 4/2018 | Kang | G09G 5/006 |
| 2005/0190294 A1 | * | 9/2005 | Monahan | H04N 5/08 348/525 |
| 2007/0146127 A1 | * | 6/2007 | Stilp | G08B 1/08 340/531 |

(Continued)

*Primary Examiner* — Gene W Lee
(74) *Attorney, Agent, or Firm* — Hanley, Flight & Zimmerman, LLC

(57) ABSTRACT

Methods and apparatus for synchronizing embedded display panels of mobile devices via programmable synchronization links are disclosed. An example mobile device includes a first embedded display panel, a second embedded display panel, a programmable synchronization link, a configuration manager, and a synchronization manager. The programmable synchronization link is operatively coupled to the first and second embedded display panels. The configuration manager is to configure the first embedded display panel as a slave panel, and to configure the second embedded display panel as a master panel. The synchronization manager is to synchronize the slave panel to the master panel via the programmable synchronization link.

20 Claims, 6 Drawing Sheets

(56) References Cited

U.S. PATENT DOCUMENTS

| | | | |
|---|---|---|---|
| 2012/0086658 A1* | 4/2012 | Moradian | G06F 1/1641 345/173 |
| 2013/0038509 A1* | 2/2013 | Jiang | G06F 3/1446 345/1.3 |
| 2015/0213745 A1* | 7/2015 | Kim | G06F 3/1446 345/1.1 |
| 2016/0380830 A1* | 12/2016 | Cheng | H04L 41/12 709/220 |

* cited by examiner

US 10,614,777 B2

METHODS AND APPARATUS FOR SYNCHRONIZING EMBEDDED DISPLAY PANELS OF MOBILE DEVICES VIA PROGRAMMABLE SYNCHRONIZATION LINKS

FIELD OF THE DISCLOSURE

This disclosure relates generally to methods and apparatus for synchronizing display panels and, more specifically, to methods and apparatus for synchronizing embedded display panels of mobile devices via programmable synchronization links.

BACKGROUND

Modern mobile devices (e.g., smartphones, tablets, laptops, personal digital assistants (PDAs), wearable devices, etc.) have a wide array of form factors and features. Some modern mobile devices implement and/or include dual embedded display panels (e.g., two separate display panels integrally mounted on or within one or more housing(s) of the mobile device). The dual embedded display panels of such mobile devices can enable data (e.g., textual, graphical and/or video data) to be displayed in various configurations. Panel synchronization issues (e.g., lag) can arise in instances where data is intended to be displayed concurrently (e.g., simultaneously) on both of the dual embedded display panels of the mobile device.

Certain examples are shown in the above-identified figures and described in detail below. In describing these examples, identical reference numbers are used to identify the same or similar elements. The figures are not necessarily to scale and certain features and certain views of the figures may be shown exaggerated in scale or in schematic for clarity and/or conciseness.

DETAILED DESCRIPTION

Some modern mobile devices implement and/or include dual embedded display panels. As used herein in reference to a mobile device, the term "embedded display panel" means a display panel that is integrally mounted on or within a housing of the mobile device. An embedded display panel of a mobile device may be implemented, for example, as a light-emitting diode (LED) display, a liquid crystal display (LCD), a touchscreen, etc. integrally mounted on or within a housing of the mobile device. In some examples, the dual embedded display panels of a mobile device may be implemented by and/or as a pair of Mobile Industry Processor Interface Display Serial Interface (MIPI DSI) Command Mode display panels. In other examples, the dual embedded display panels of a mobile device may be implemented by and/or as a pair of embedded DisplayPort (eDP) display panels.

Figure 1:
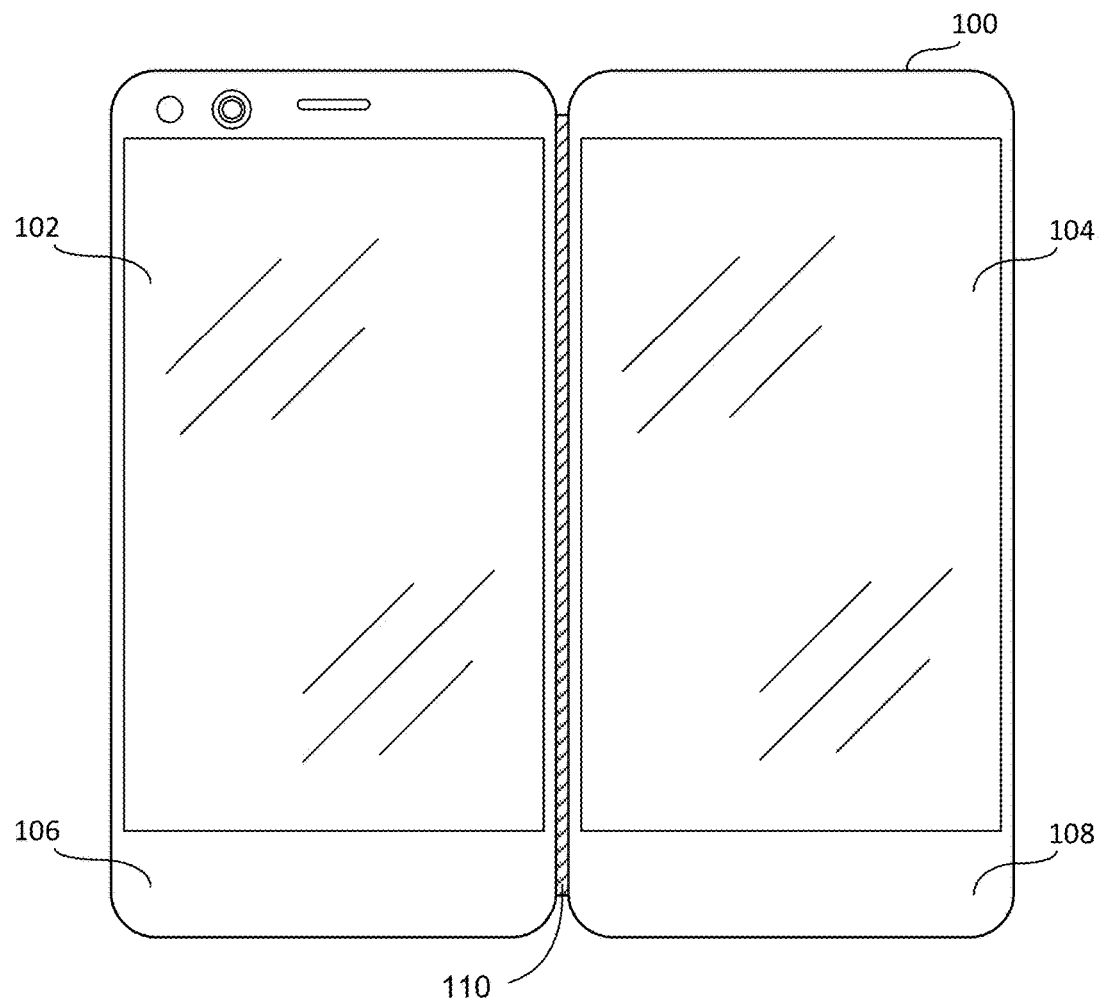
FIG. 1 illustrates a known mobile device having dual embedded display panels.

FIG. 1 illustrates a known mobile device 100 having dual embedded display panels. More specifically, the mobile device 100 of FIG. 1 includes a first embedded display panel 102 and a second embedded display panel 104. The first embedded display panel 102 is integrally mounted on or within a first housing or bezel 106 of the mobile device 100, and the second embedded display panel 104 is integrally mounted on or within a second housing or bezel 108 of the mobile device 100. The first housing 106 is coupled to the second housing 108 via a mechanical link 110 (e.g., a hinge) that enables the second housing 108 to be moved (e.g., rotated) relative to the first housing 106. The second embedded display panel 104 moves (e.g., rotates) relative to the first embedded display panel 102 in conjunction with the second housing 108 moving (e.g., rotating) relative to the first housing 106.

The first and second embedded display panels 102, 104 of the known mobile device 100 of FIG. 1 enable data (e.g., textual, graphical and/or video data) to be displayed in various configurations. For example, in a single panel mode and/or configuration of the mobile device 100 of FIG. 1, data associated with an application executing on the mobile device 100 can be displayed on the first embedded display panel 102 of the mobile device 100 while the second embedded display panel 104 of the mobile device 100 is disabled and/or not in use, or vice-versa. In a dual panel mode and/or configuration of the mobile device 100 of FIG. 1, data associated with a first application executing on the mobile device 100 can be displayed on the first embedded display panel 102 of the mobile device 100 while different data associated with a second application executing on the mobile device 100 of FIG. 1 is concurrently displayed on the second embedded display panel 104 of the mobile device 100. In a mirrored panel mode and/or configuration of the mobile device 100 of FIG. 1, data associated with an application executing on the mobile device 100 of FIG. 1 can be displayed on the first embedded display panel 102 of the mobile device 100 while the same data is concurrently displayed (e.g., as a mirrored image) on the second embedded display panel 104 of the mobile device 100. In an extended panel mode and/or configuration of the mobile device 100 of FIG. 1, data associated with an application executing on the mobile device 100 can be displayed in an extended, shared and/or enlarged manner across both the first and second embedded display panels 102, 104 of the mobile device 100.

The first and second embedded display panels 102, 104 of the known mobile device 102 of FIG. 1 may be implemented as dual MIPI DSI Command Mode display panels. Conventionally, panel timings for MIPI DSI Command Mode display panels are driven locally by the panel (e.g., via a panel timing controller), thereby allowing for enhanced power management on a source device (e.g., a Graphics Processing Unit (GPU)) of the mobile device. When implementing dual MIPI DSI Command Mode display panels in a mobile device, synchronization between the two display panels cannot be maintained by the source device because the respective panel timings are controlled locally by the panels. Additional hardware in the form of pins and/or wires must be implemented between the two MIPI DSI Command Mode display panels to maintain synchronization between the two display panels. Such pins and/or wires must typically be structured and/or configured to cross over a thin bezel and/or housing extending between the two display panels.

The above-described conventional solution for implementing dual MIPI DSI Command Mode display panels in a mobile device is, when viable, undesirably expensive. Absent adequate synchronization between the dual MIPI DSI Command Mode display panels, however, synchronization issues (e.g., lag) may arise which hamper and/or undermine the intended data viewing experience for a user of the mobile device. Such synchronization issues are particularly likely to occur in instances where one or more user(s) of the mobile device is/are viewing video data that is being displayed and/or presented concurrently (e.g., simultaneously) on both of the dual MIPI DSI Command Mode display panels of the mobile device.

Unlike the above-described conventional solutions for implementing dual MIPI DSI Command Mode display panels in a mobile device, the methods and apparatus disclosed herein advantageously synchronize first and second embedded display panels of a mobile device via a programmable synchronization link of the mobile device that extends between and/or is operatively coupled to the first and second embedded display panels. The first and second embedded display panels are respectively configurable as either a master panel or a slave panel. For example, one of the first and second embedded display panels may be configured as a slave panel of the mobile device, and the other one of the first and second embedded display panels may be configured as the master panel of the mobile device. The programmable synchronization link of the mobile device is bidirectional, and may advantageously be configured to transmit synchronization data from the one of the first and second embedded display panels that is configured as the master panel of the mobile device to the other one of the first and second embedded display panels that is configured as the slave panel of the mobile device.

The disclosed methods and apparatus may be implemented in connection with mobile devices having two or more MIPI DSI Command Mode display panels that require synchronization, and may also be implemented in connection with mobile devices having two or more eDP display panels that require synchronization. When implemented in connection with such mobile devices, the disclosed methods and apparatus reduce (e.g., minimize or eliminate) synchronization issues such as lag, and advantageously provide for an improved user experience in relation to the mobile device, particularly in instances where one or more user(s) of the mobile device is/are viewing video data that is being displayed and/or presented concurrently (e.g., simultaneously) on two or more of the embedded display panels of the mobile device.

Figure 2:
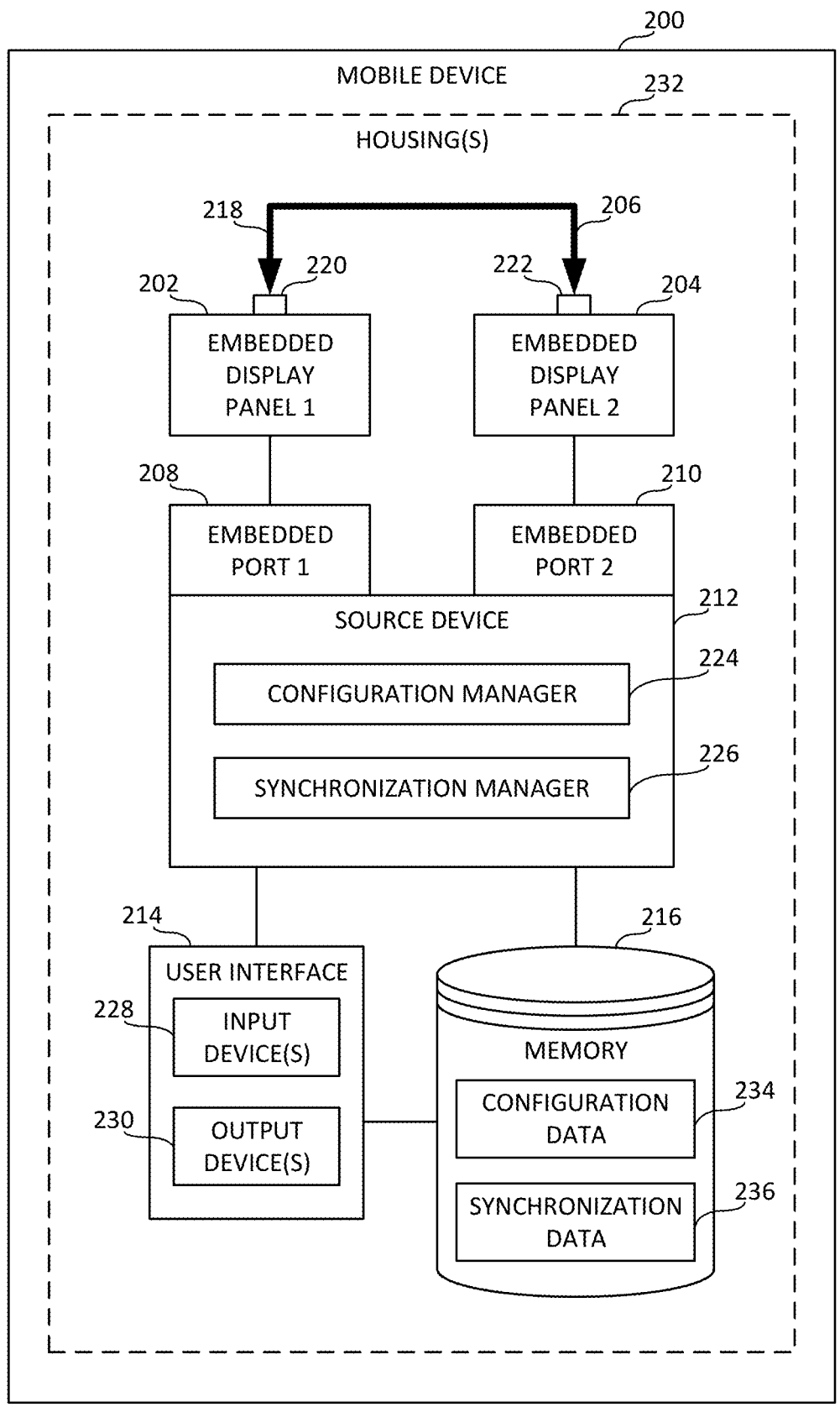
FIG. 2 is a block diagram of an example mobile device constructed in accordance with the teachings of this disclosure.

FIG. 2 is a block diagram of an example mobile device 200 constructed in accordance with the teachings of this disclosure. In the illustrated example of FIG. 2, the mobile device includes an example first embedded display panel 202, an example second embedded display panel 204, an example programmable synchronization link 206, an example first embedded port 208, an example second embedded port 210, an example source device 212, an example user interface 214, and an example memory 216. The example programmable synchronization link 206 of FIG. 2 implements, includes and/or interfaces with an example bidirectional general-purpose input/output (GPIO) pin 218 extending between example first and second input/output interfaces 220, 222 of the programmable synchronization link 206. The example source device 212 of FIG. 2 implements, includes and/or interfaces with an example configuration manager 224 and an example synchronization manager 226. The example user interface 214 of FIG. 2 implements, includes and/or interfaces with one or more example input device(s) 228 and one or more example output device(s) 230. However, other example implementations of the mobile device 200 may include fewer or additional structures.

In the illustrated example of FIG. 2, the mobile device 200 further includes one or more example housing(s) 232. The housing(s) 232 of the mobile device 200 are structured, shaped and/or configured to house, encase and/or contain portions and/or the entirety of various components of the mobile device 200 including, for example, the first embedded display panel 202, the second embedded display panel 204, the programmable synchronization link 206, the first embedded port 208, the second embedded port 210, the source device 212, the user interface 214, the memory 216, the bidirectional GPIO pin 218, the first input/output interfaces 220, the second input/output interface 222, the configuration manager 224, the synchronization manager 226, the input device(s) 228, and/or the output device(s) 230 of FIG. 2. The housing(s) 232 of FIG. 2 may include one or more bezel(s) structured, shaped and/or configured to house, encase and/or contain portions of the first embedded display panel 202 and/or portions of the second embedded display panel 204.

In some examples, the housing(s) 232 of the mobile device 200 may be implemented as a single housing that houses both of the first and second embedded display panels 202, 204 of the mobile device 200. In other examples, the housing(s) 232 of the mobile device 200 may be implemented as a first housing that houses the first embedded display panel 202 of the mobile device 200, and a second housing (e.g., mechanically coupled to and/or integrally formed with the first housing) that houses the second embedded display panel 204 of the mobile device 200.

In the illustrated example of FIG. 2, the first embedded display panel 202 is operatively coupled to (e.g., in electrical communication with) the first embedded port 208, and is also operatively coupled to the first input/output interface 220 of the programmable synchronization link 206. The second embedded display panel 204 is operatively coupled to the second embedded port 210, and is also operatively coupled to the second input/output interface 222 of the programmable synchronization link 206. The bidirectional GPIO pin 218 of the programmable synchronization link 206 is operatively coupled to the first and second input/output interfaces 220, 222 of the programmable synchronization link 206. The programmable synchronization link 206 is therefore operatively coupled to the first and second embedded display panels 202, 204. The first and second embedded ports 208, 210 are respectively operatively coupled to the source device 212. The user interface 214 is operatively coupled to the source device 212, and is also operatively coupled to the memory 216. The memory 216 is operatively coupled to the source device 212, and is also operatively coupled to the user interface 214.

The example first embedded display panel 202 of FIG. 2 is a display (e.g., an LED display, an LCD, a touchscreen, etc.) structured and/or configured to present data (e.g., textual data, graphical data, video data, etc.) on and/or via the mobile device 200 of FIG. 2. Data displayed and/or presented via the first embedded display panel 202 of FIG. 2 may be viewed by an end user of the mobile device 200. In some examples, the first embedded display panel 202 may be implemented as a touchscreen display panel that enables the user of the mobile device 200 to interact with the data being displayed and/or presented via the first embedded display panel 202. In such examples, the touchscreen display panel may additionally or alternatively enable the user to convey information, commands, and/or user inputs to the mobile device 200. In some examples, the first embedded display panel 202 of FIG. 2 may be implemented by and/or as a MIPI DSI Command Mode display panel. In other examples, the first embedded display panel 202 of FIG. 2 may be implemented by and/or as an eDP display panel.

The first embedded display panel 202 of FIG. 2 may be configured (e.g., via the example configuration manager 224 of FIG. 2 described below) as the master panel of the mobile device 200 or as the slave panel of the mobile device 200. When the first embedded display panel 202 is configured as the slave panel of the mobile device 200, the first embedded display panel 202 may be synchronized (e.g., via the example synchronization manager 226 of FIG. 2 described below) to another embedded display panel (e.g., the second embedded display panel 204 of FIG. 2) that is configured as the master panel of the mobile device 200.

The example second embedded display panel 204 of FIG. 2 is a display (e.g., an LED display, an LCD, a touchscreen, etc.) structured and/or configured to present data (e.g., textual data, graphical data, video data, etc.) on and/or via the mobile device 200 of FIG. 2. Data displayed and/or presented via the first embedded display panel 202 of FIG. 2 may be viewed by an end user of the mobile device 200. In some examples, the second embedded display panel 204 may be implemented as a touchscreen display panel that enables the user of the mobile device 200 to interact with the data being displayed and/or presented via the second embedded display panel 204. In such examples, the touchscreen display panel may additionally or alternatively enable the user to convey information, commands, and/or user inputs to the mobile device 200. In some examples, the second embedded display panel 204 of FIG. 2 may be implemented by and/or as a MIPI DSI Command Mode display panel. In other examples, the second embedded display panel 204 of FIG. 2 may be implemented by and/or as an eDP display panel.

The second embedded display panel 204 of FIG. 2 may be configured (e.g., via the example configuration manager 224 of FIG. 2 described below) as the master panel of the mobile device 200 or as the slave panel of the mobile device 200. When the second embedded display panel 204 is configured as the slave panel of the mobile device 200, the second embedded display panel 204 may be synchronized (e.g., via the example synchronization manager 226 of FIG. 2 described below) to another embedded display panel (e.g., the first embedded display panel 202 of FIG. 2) that is configured as the master panel of the mobile device 200.

The example programmable synchronization link 206 of FIG. 2 is a bidirectional operative coupling that facilitates synchronizing the second embedded display panel 204 of the mobile device 200 to the first embedded display panel 202 of the mobile device 200, or vice-versa. In the illustrated example of FIG. 2, the programmable synchronization link 206 includes the bidirectional GPIO pin 218, the first input/output interface 220, and the second input/output interface 222. The first input/output interface 220 is associated with the first embedded display panel 202. The second input/output interface 222 is associated with the second embedded display panel 204. The bidirectional GPIO pin 218 extends between the first and second input/output interfaces 220, 222. The first and second input/output interfaces 220, 222 and/or, more generally, the programmable synchronization link 206 is/are programmable and/or configurable via the configuration manager 224 and/or, more generally, via the source device 212 of FIG. 2 described below.

The programmable synchronization link 206 of FIG. 2 can be programmed and/or configured (e.g., via the example configuration manager 224 of FIG. 2 described below) to transmit data (e.g., synchronization data) from the configured master panel of the mobile device 200 to the configured slave panel of the mobile device 200. For example, the programmable synchronization link 206 of FIG. 2 may be programmed and/or configured to transmit data from the first embedded display panel 202 configured as the master panel of the mobile device 200 to the second embedded display panel 204 configured as the slave panel of the mobile device 200. As another example, the programmable synchronization link 206 of FIG. 2 may be programmed and/or configured to transmit data from the second embedded display panel 204 configured as the master panel of the mobile device 200 to the first embedded display panel 202 configured as the slave panel of the mobile device 200.

The example first embedded port 208 of FIG. 2 facilitates communications between the first embedded display panel 202 of the mobile device 200 and the source device 212 of the mobile device 200. For example, the first embedded port 208 may enable the configuration manager 224 of the source device 212 of FIG. 2 to convey configuration data and/or commands (e.g., the example configuration data 234 of FIG. 2) to the first embedded display panel 202 of FIG. 2, and/or to the programmable synchronization link 206 of FIG. 2 coupled to the first embedded display panel 202. As another example, the first embedded port 208 may enable the synchronization manager 226 of the source device 212 of FIG. 2 to convey synchronization data and/or commands (e.g., the example synchronization data 236 of FIG. 2) to the first embedded display panel 202 of FIG. 2, and/or to the programmable synchronization link 206 of FIG. 2 coupled to the first embedded display panel 202.

The example second embedded port 210 of FIG. 2 facilitates communications between the second embedded display panel 204 of the mobile device 200 and the source device 212 of the mobile device 200. For example, the second embedded port 210 may enable the configuration manager 224 of the source device 212 of FIG. 2 to convey configuration data and/or commands (e.g., the example configuration data 234 of FIG. 2) to the second embedded display panel 204 of FIG. 2, and/or to the programmable synchronization link 206 of FIG. 2 coupled to the second embedded display panel 204. As another example, the second embedded port 210 may enable the synchronization manager 226 of the source device 212 of FIG. 2 to convey synchronization data and/or commands (e.g., the example synchronization data 236 of FIG. 2) to the second embedded display panel 204 of FIG. 2, and/or to the programmable synchronization link 206 of FIG. 2 coupled to the second embedded display panel 204.

The example source device 212 of FIG. 2 is a hardware device that may be implemented by any type(s) and/or any number(s) of semiconductor device(s) (e.g., microprocessor (s), microcontroller(s), etc.). In some examples, the source device 212 may be implemented by one or more graphics processing unit(s) (GPU(s)) structured and/or configured to convey data (e.g., textual data, graphical data, video data, etc.) to the first and/or second embedded display panel(s) 202, 204 of FIG. 2 for display thereon and/or thereby. As mentioned above, the source device 212 includes the example configuration manager 224 and the example synchronization manager 226. In some examples, the configuration manager 224 and the synchronization manager 226, and/or, more generally, the source device 212 of FIG. 2 may implement software and/or an application programming interface to assist the configuration manager 224 and the synchronization manager 226 in configuring and synchronizing respective ones of the first and second embedded display panels 202, 204 of the mobile device 200.

The example configuration manager 224 of FIG. 2 controls and/or manages the respective configurations of the first and second embedded display panels 202, 204 of the mobile device 200 of FIG. 2. The configuration manager 224 of FIG. 2 may configure the first embedded display panel 202 of FIG. 2 by conveying configuration data and/or one or more configuration command(s) from the source device 212 of FIG. 2 to the first embedded display panel 202 via the first embedded port 208 of FIG. 2. The configuration manager 224 of FIG. 2 may configure the second embedded display panel 204 of FIG. 2 by conveying configuration data and/or one or more configuration command(s) from the source device 212 of FIG. 2 to the second embedded display panel 204 via the second embedded port 210 of FIG. 2.

The configuration manager 224 of FIG. 2 may detect and/or determine that only one of the first and second embedded display panels 202, 204 of the mobile device 200 is enabled or is to become enabled (e.g., enabled to display video data). In response to detecting and/or determining that only one of the first and second embedded display panels 202, 204 of the mobile device 200 is enabled or is to become enabled, the configuration manager 224 of FIG. 2 configures the one of the first and second embedded display panels 202, 204 as the master panel of the mobile device 200.

For example, in response to detecting and/or determining that only the first embedded display panel 202 is enabled or is to become enabled, the configuration manager 224 of FIG. 2 configures the first embedded display panel 202 as the master panel of the mobile device 200. As another example, in response to detecting and/or determining that only the second embedded display panel 204 is enabled or is to become enabled, the configuration manager 224 of FIG. 2 configures the second embedded display panel 204 as the master panel of the mobile device 200.

The configuration manager 224 of FIG. 2 may alternatively detect and/or determine that both of the first and second embedded display panels 202, 204 of the mobile device 200 are to be enabled concurrently (e.g., enabled to display video data at the same time). In response to detecting and/or determining that both of the first and second embedded display panels 202, 204 of the mobile device 200 are to be enabled concurrently, the configuration manager 224 of FIG. 2 configures a first one of the first and second embedded display panels 202, 204 as the slave panel of the mobile device 200, and also (e.g., subsequently) configures a second one of the first and second embedded display panels 202, 204 as the master panel of the mobile device 200.

For example, in response to detecting and/or determining that both of the first and second embedded display panels 202, 204 are to be enabled concurrently, the configuration manager 224 of FIG. 2 may configure the first embedded display panel 202 as the slave panel of the mobile device 200, and may also (e.g., subsequently) configure the second embedded display panel 204 as the master panel of the mobile device 200. As another example, in response to detecting and/or determining that both of the first and second embedded display panels 202, 204 are to be enabled concurrently, the configuration manager 224 of FIG. 2 may alternatively configure the second embedded display panel 204 as the slave panel of the mobile device 200, and may also (e.g., subsequently) configure the first embedded display panel 202 as the master panel of the mobile device 200.

In some examples, the configuration manager 224 of FIG. 2 determines which one of the first and second embedded display panels 202, 204 is to be configured as the master panel of the mobile device 200 based on whether one of the first and second embedded display panels 202, 204 is currently enabled. For example, if the configuration manager 224 of FIG. 2 detects and/or determines that the first embedded display panel 202 is currently enabled and that the second embedded display panel 204 is not currently enabled, the configuration manager 224 of FIG. 2 may configure the second embedded display panel 204 as the slave panel of the mobile device 200, and may configure the first embedded display panel 202 as the master panel of the mobile device 200. If the configuration manager 224 of FIG. 2 instead detects and/or determines that the second embedded display panel 204 is currently enabled and that the first embedded display panel 202 is not currently enabled, the configuration manager 224 of FIG. 2 may configure the first embedded display panel 202 as the slave panel of the mobile device 200, and may configure the second embedded display panel 204 as the master panel of the mobile device 200.

In some examples, the configuration manager 224 of FIG. 2 determines which one of the first and second embedded display panels 202, 204 is to be configured as the master panel of the mobile device 200 based on one or more command(s) received at the configuration manager 2108 and/or more generally, at the source device 212 of FIG. 2. In some examples, the command(s) received at the configuration manager 224 and/or the source device 212 of FIG. 2 may be received from the example user interface 214 of FIG. 2 described below.

The configuration manager 224 of FIG. 2 may determine whether either of the two currently configured ones of the first and second embedded display panels 202, 204 is disabled or is to become disabled. If the configuration manager 224 of FIG. 2 determines that the one of the first and second embedded display panels 202, 204 that is currently configured as the slave panel is disabled or is to become disabled, the configuration manager 224 retains the master panel configuration associated with the other one of the first and second embedded display panels 202, 204 that is currently configured as the master panel. For example, if the configuration manager 224 of FIG. 2 detects and/or determines that both of the first and second embedded display panels 202, 204 are configured, and further detects and/or determines that the first embedded display panel 202 currently configured as the slave panel is disabled or is to become disabled, the configuration manager 224 retains the master panel configuration associated with the second embedded display panel 204 that is currently configured as the master panel. As another example, if the configuration manager 224 of FIG. 2 detects and/or determines that both of the first and second embedded display panels 202, 204 are configured, and further detects and/or determines that the second embedded display panel 204 currently configured as the slave panel is disabled or is to become disabled, the configuration manager 224 retains the master panel configuration associated with the first embedded display panel 202 that is currently configured as the master panel.

If the configuration manager 224 of FIG. 2 instead determines that the one of the first and second embedded display panels 202, 204 that is currently configured as the master panel is disabled or is to become disabled, the configuration manager 224 reconfigures the other one of the first and second embedded display panels 202, 204 that is currently configured as the slave panel to be the new master panel. For example, if the configuration manager 224 of FIG. 2 detects and/or determines that both of the first and second embedded display panels 202, 204 are configured, and further detects and/or determines that the first embedded display panel 202 currently configured as the master panel is disabled or is to become disabled, the configuration manager 224 reconfigures the second embedded display panel 204 that is currently configured as the slave panel to be the new master panel. As another example, if the configuration manager 224 of FIG. 2 detects and/or determines that both of the first and second embedded display panels 202, 204 are configured, and further detects and/or determines that the second embedded display panel 204 currently configured as the master panel is disabled or is to become disabled, the configuration manager 224 reconfigures the first embedded display panel 202 that is currently configured as the slave panel to be the new master panel.

The example configuration manager 224 of FIG. 2 also controls and/or manages the configuration of the programmable synchronization link 206 of FIG. 2. The configuration manager 224 of FIG. 2 may configure the programmable synchronization link 206 of FIG. 2 by conveying configuration data and/or one or more configuration command(s) from the source device 212 of FIG. 2 to the programmable synchronization link 206 via the first embedded port 208 of FIG. 2 and the first embedded display panel 202 of FIG. 2. The configuration manager 224 of FIG. 2 may alternatively configure the programmable synchronization link 206 of FIG. 2 by conveying configuration data and/or one or more configuration command(s) from the source device 212 of FIG. 2 to the programmable synchronization link 206 via the second embedded port 210 of FIG. 2 and the second embedded display panel 204 of FIG. 2.

In some examples, the configuration manager 224 of FIG. 2 controls and/or manages the configuration of the programmable synchronization link 206 of FIG. 2 based on the above-described configurations of the first and second embedded display panels 202, 204 that have been established via the configuration manager 224 of FIG. 2. For example, in response to the configuration manager 224 of FIG. 2 configuring the second embedded display panel 204 as the slave panel of the mobile device 200 and configuring the first embedded display panel 202 as the master panel of the mobile device 200, the configuration manager 224 of FIG. 2 configures, programs and/or enables the programmable synchronization link 206 of FIG. 2 as a transmitter to transmit synchronization data from the first embedded display panel 202 configured as the master panel to the second embedded display panel 204 configured as the slave panel. As another example, in response to the configuration manager 224 of FIG. 2 configuring the first embedded display panel 202 as the slave panel of the mobile device 200 and configuring the second embedded display panel 204 as the master panel of the mobile device 200, the configuration manager 224 of FIG. 2 configures, programs and/or enables the programmable synchronization link 206 of FIG. 2 as a transmitter to transmit synchronization data from the second embedded display panel 204 configured as the master panel to the first embedded display panel 202 configured as the slave panel.

The configuration manager 224 of FIG. 2 may be implemented by any type(s) and/or any number(s) of semiconductor device(s) (e.g., microprocessor(s), microcontroller(s), etc.). Example configuration data 234 detected, determined and/or conveyed by the configuration manager 224 of FIG. 2 may be of any type, form and/or format, and may be stored in a non-transitory computer-readable storage medium such as the example memory 216 of FIG. 2 described below.

The example synchronization manager 226 of FIG. 2 controls and/or manages the synchronization of the configured slave panel of the mobile device 200 to the configured master panel of the mobile device 200 via the configured programmable synchronization link 206 of the mobile device 200. For example, in instances where the first embedded display panel 202 of FIG. 2 is configured as the master panel and the second embedded display panel 204 of FIG. 2 is configured as the slave panel, the synchronization manager 226 of FIG. 2 may convey and/or transmit synchronization data and/or one or more synchronization command(s) from the source device 212 of FIG. 2 to the configured programmable synchronization link 206 of FIG. 2 via the first embedded port 208 of FIG. 2 and the first embedded display panel 202. In such an example, the configured programmable synchronization link 206 may transmit the synchronization data from the first embedded display panel 202 configured as the master panel to the second embedded display panel 204 configured as the slave panel.

As another example, in instances where the second embedded display panel 204 of FIG. 2 is configured as the master panel and the first embedded display panel 202 of FIG. 2 is configured as the slave panel, the synchronization manager 226 of FIG. 2 may convey and/or transmit synchronization data and/or one or more synchronization command(s) from the source device 212 of FIG. 2 to the configured programmable synchronization link 206 of FIG. 2 via the second embedded port 210 of FIG. 2 and the second embedded display panel 204. In such an example, the configured programmable synchronization link 206 may transmit the synchronization data from the second embedded display panel 204 configured as the master panel to the first embedded display panel 202 configured as the slave panel.

The synchronization manager 226 of FIG. 2 may be implemented by any type(s) and/or any number(s) of semiconductor device(s) (e.g., microprocessor(s), microcontroller(s), etc.). Example synchronization data 236 detected, determined and/or conveyed by the synchronization manager 226 of FIG. 2 may be of any type, form and/or format, and may be stored in a non-transitory computer-readable storage medium such as the example memory 216 of FIG. 2 described below.

Figure 3:
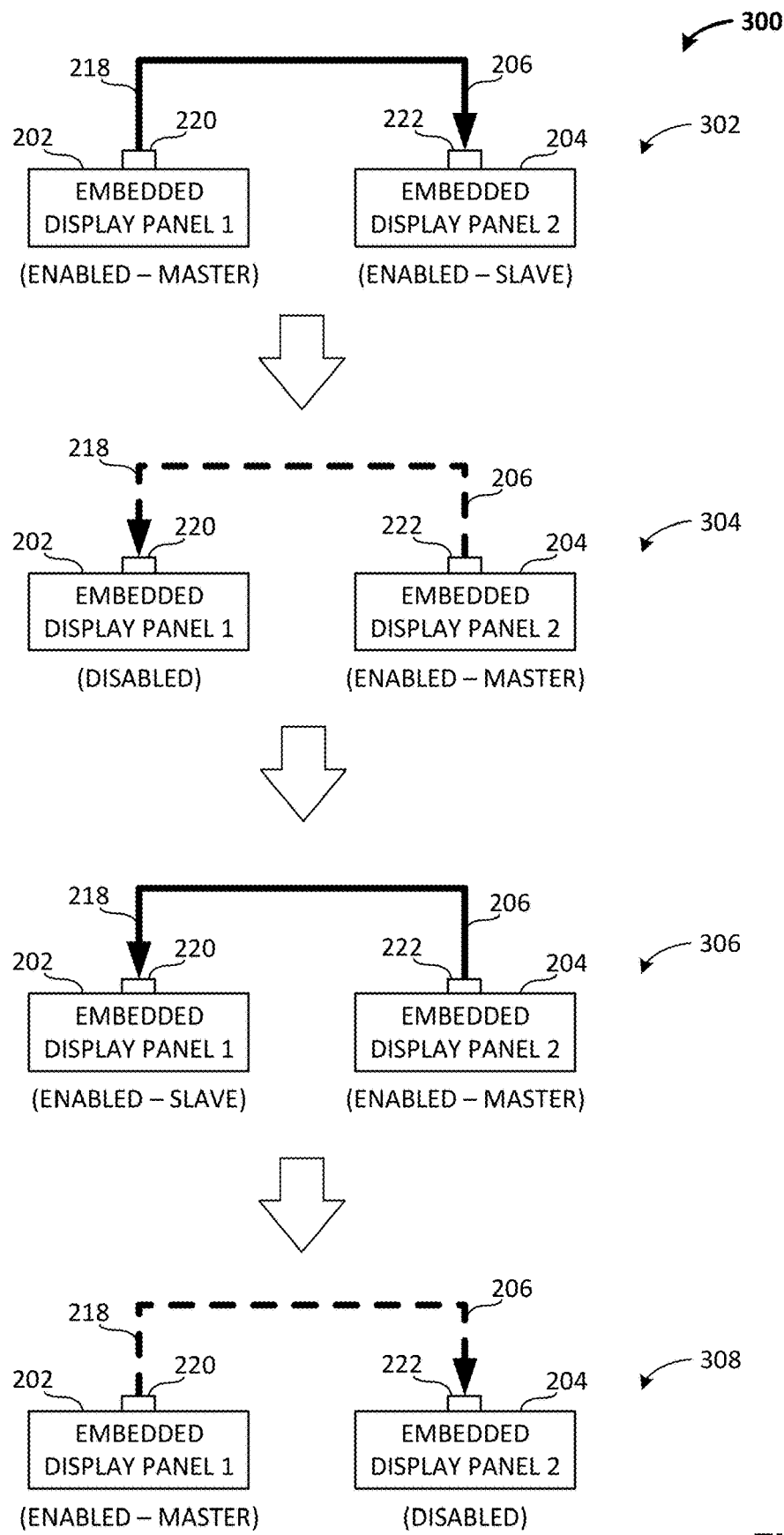
FIG. 3 illustrates an example configuration sequence that may be implemented at the example mobile device of FIG. 2 to configure and synchronize the example first and second embedded display panels of the example mobile device of FIG. 2.

FIG. 3 illustrates an example configuration sequence 300 that may be implemented at the example mobile device 200 of FIG. 2 to configure and synchronize the example first and second embedded display panels 202, 204 of the example mobile device 200 of FIG. 2. The configuration sequence 300 of FIG. 3 illustrates a first example configuration 302 of the first and second embedded display panels 202, 204, a second example configuration 304 of the first and second embedded display panels 202, 204, a third example configuration 306 of the first and second embedded display panels 202, 204, and a fourth example configuration 308 of the first and second embedded display panels 202, 204.

In the first configuration 302 of FIG. 3, the first and second embedded display panels 202, 204 are both enabled. The configuration manager 224 of FIG. 2 has configured the second embedded display panel 204 as the slave panel of the mobile device 200, and has further (e.g., subsequently) configured the first embedded display panel 202 as the master panel of the mobile device 200. The configuration manager 224 has further configured the programmable synchronization link 206 of FIG. 2 to transmit synchronization data from the first embedded display panel 202 configured as the master panel of the mobile device 200 to the second embedded display panel 204 configured as the slave panel of the mobile device 200. The synchronization manager 226 of FIG. 2 has synchronized the second embedded display panel 204 configured as the slave panel of the mobile device 200 to the first embedded display panel 202 configured as the master panel of the mobile device 200.

The mobile device 200 of FIG. 2 transitions from the first configuration 302 of FIG. 3 to the second configuration 304 of FIG. 3 in response to the first embedded display panel 202 currently configured as the master panel of the mobile device 200 becoming disabled (e.g., disabled from displaying video data). In response to the first embedded display panel 202 currently configured as the master panel of the mobile device 200 becoming disabled, the configuration manager 224 disables the programmable synchronization link 206 and reconfigures the second embedded display panel 204 currently configured as the slave panel of the mobile device 200 as the new master panel of the mobile device 200.

In the second configuration 304 of FIG. 3, the first embedded display panel 202 of the mobile device 200 is disabled, and the second embedded display panel 204 of the mobile device 200 is enabled. The configuration manager 224 of FIG. 2 has configured the second embedded display panel 204 as the master panel of the mobile device 200. The configuration manager 224 of FIG. 2 has disabled the programmable synchronization link 206 of FIG. 2. Thus, the first embedded display panel 202, which is disabled, is not synchronized to the second embedded display panel 204 when the mobile device 200 is in the second configuration 304 of FIG. 3.

The mobile device 200 of FIG. 2 transitions from the second configuration 304 of FIG. 3 to the third configuration 306 of FIG. 3 in response to receiving a command (e.g., via the example user interface 214 of FIG. 2 described below) indicating that both of the first and second embedded display panels 202, 204 of the mobile device 200 are to be enabled concurrently (e.g., enabled to display video data at the same time). In response to the received command, the configuration manager 224 configures and enables the first embedded display panel 202 as the slave panel of the mobile device 200, and again configures the already enabled second embedded display panel 204 as the master panel of the mobile device 200.

In the third configuration 306 of FIG. 3, the first and second embedded display panels 202, 204 are both enabled. The configuration manager 224 of FIG. 2 has configured the first embedded display panel 202 as the slave panel of the mobile device 200, and has further (e.g., subsequently) configured the second embedded display panel 204 as the master panel of the mobile device 200. The configuration manager 224 has further configured the programmable synchronization link 206 of FIG. 2 to transmit synchronization data from the second embedded display panel 204 configured as the master panel of the mobile device 200 to the first embedded display panel 202 configured as the slave panel of the mobile device 200. The synchronization manager 226 of FIG. 2 has synchronized the first embedded display panel 202 configured as the slave panel of the mobile device 200 to the second embedded display panel 204 configured as the master panel of the mobile device 200.

The mobile device 200 of FIG. 2 transitions from the third configuration 306 of FIG. 3 to the fourth configuration 308 of FIG. 3 in response to the second embedded display panel 204 currently configured as the master panel of the mobile device 200 becoming disabled (e.g., disabled from displaying video data). In response to the second embedded display panel 204 currently configured as the master panel of the mobile device 200 becoming disabled, the configuration manager 224 disables the programmable synchronization link 206 and reconfigures the first embedded display panel 202 currently configured as the slave panel of the mobile device 200 as the new master panel of the mobile device 200.

In the fourth configuration 308 of FIG. 3, the first embedded display panel 202 of the mobile device 200 is enabled, and the second embedded display panel 204 of the mobile device 200 is disabled. The configuration manager 224 of FIG. 2 has configured the first embedded display panel 202 as the master panel of the mobile device 200. The configuration manager 224 of FIG. 2 has disabled the programmable synchronization link 206 of FIG. 2. Thus, the second embedded display panel 204, which is disabled, is not synchronized to the first embedded display panel 202 when the mobile device 200 is in the fourth configuration 308 of FIG. 3.

The mobile device 200 of FIG. 2 may transition from the fourth configuration 308 of FIG. 3 back to the first configuration 302 of FIG. 3 described above in response to receiving a command (e.g., via the example user interface 214 of FIG. 2 described below) indicating that both of the first and second embedded display panels 202, 204 of the mobile device 200 are to be enabled concurrently (e.g., enabled to display video data at the same time). In response to the received command, the configuration manager 224 configures and enables the second embedded display panel 204 as the slave panel of the mobile device 200, and again configures the already enabled first embedded display panel 202 as the master panel of the mobile device 200.

Figure 4:
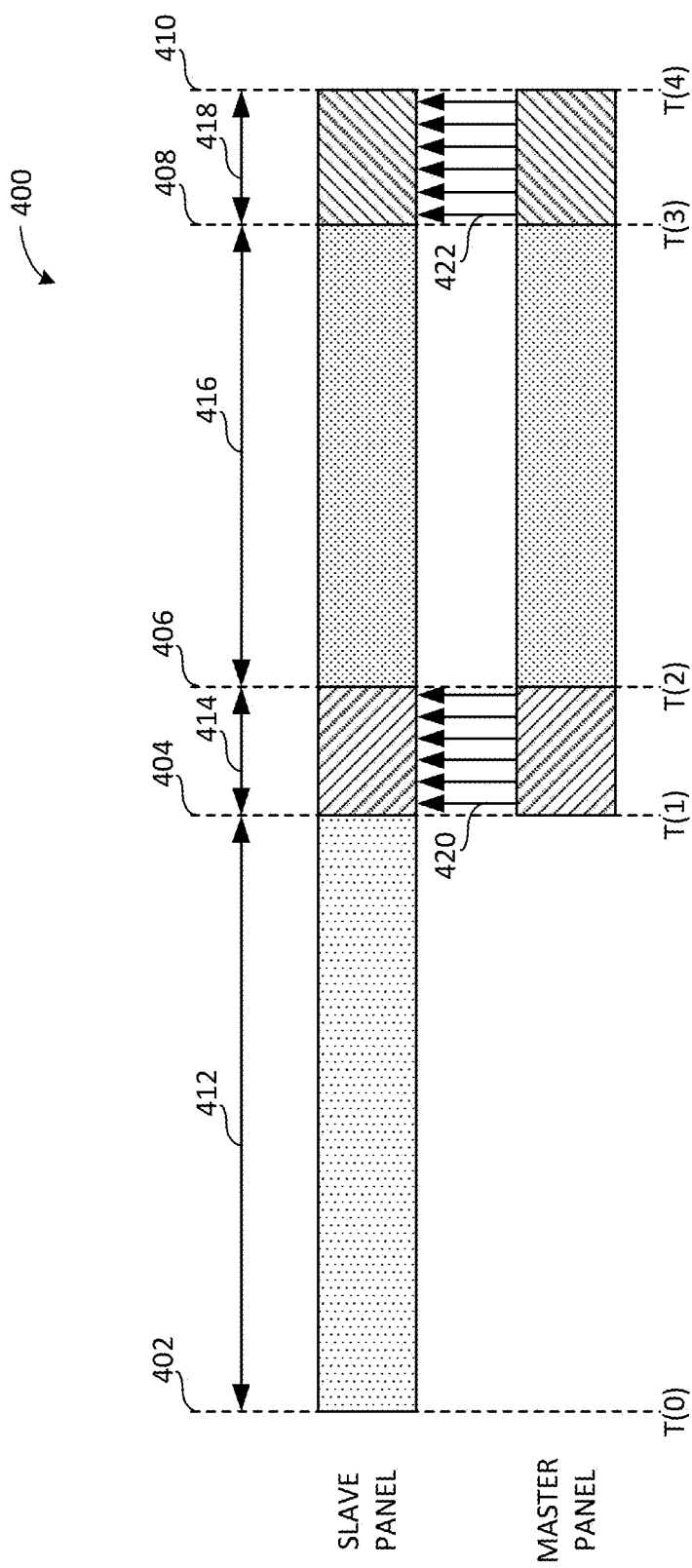
FIG. 4 illustrates an example configuration scheme that may be implemented at the example mobile device of FIG. 2 to configure and synchronize the example first and second embedded display panels of the example mobile device of FIG. 2.

FIG. 4 illustrates an example configuration scheme 400 that may be implemented at the example mobile device 200 of FIG. 2 to configure and synchronize the example first and second embedded display panels 202, 204 of the example mobile device 200 of FIG. 2. The configuration scheme 400 of FIG. 4 includes an example first time T(0) 402, an example second time T(1) 404, an example third time T(2) 406, and example fourth time T(3) 408, an example fifth time T(4) 410, an example first time period 412, an example second time period 414, an example third time period 416, an example fourth time period 418, example frame sync data 420, and example line sync data 422. The first time period 412 of FIG. 4 begins at the first time T(0) 402 and ends at the second time T(1) 404. The second time period 414 of FIG. 4 begins at the second time T(1) 404 and ends at the third time T(2) 406. The third time period 416 of FIG. 4 begins at the third time T(2) 406 and ends at the fourth time T(3) 408. The fourth time period 418 of FIG. 8 begins at the fourth time T(3) 408 and ends at the fifth time T(4) 410.

In the illustrated example of FIG. 4, the configuration manager 224 of FIG. 2 configures and enables one of the first and second embedded display panels 202, 204 of the mobile device 200 of FIG. 2 as the slave panel of the mobile device 200 at the first time T(0) 402 of the configuration scheme 400. For example, the configuration manager 224 of FIG. 2 may configure and enable the first embedded display panel 202 of the mobile device 200 as the slave panel at the first time T(0) 402. In the illustrated example of FIG. 4, the slave panel of the mobile device 200 remains configured as the slave panel throughout the first time period 412, the second time period 414, the third time period 416, and the fourth time period 418 of the configuration scheme 400.

During the first time period 412 of FIG. 4, the panel timings of the configured and enabled slave panel are initiated and gated. The panel timings of the slave panel remain gaited until at least the third time period 416 of the configuration scheme 400. In some examples, the panel timings of the slave panel first become ungated in response to the transmitted frame sync data 420 of FIG. 4 being received at the slave panel, as further described below. In other examples, the panel timings of the slave panel first become ungated in response to the transmitted line sync data 422 of FIG. 4 being received at the slave panel, as further described below.

The configuration manager 224 of FIG. 2 configures and enables the other one of the first and second embedded display panels 202, 204 of the mobile device 200 of FIG. 2 as the master panel of the mobile device 200 at the second time T(1) 404 of the configuration scheme 400. For example, the configuration manager 224 of FIG. 2 may configure and enable the second embedded display panel 204 of the mobile device 200 as the master panel at the second time T(1) 402. In the illustrated example of FIG. 4, the master panel of the mobile device 200 remains configured as the master panel throughout the second time period 414, the third time period 416, and the fourth time period 418 of the configuration scheme 400.

During the second time period 414 of FIG. 4, the panel timings of the configured and enabled master panel are initiated and gated. The panel timings of the master panel remain gaited until at least the third time period 416 of the configuration scheme 400. In some examples, the panel timings of the master panel first become ungated in response to the frame sync data 420 of FIG. 4 being transmitted from the master panel, as further described below. In other examples, the panel timings of the master panel first become ungated in response to the line sync data 422 of FIG. 4 being transmitted from the master panel, as further described below.

The second time period 414 of the configuration scheme 400 of FIG. 4 corresponds to a vertical blanking interval. During the second time period 414 of FIG. 4, the synchronization manager 226 of FIG. 2 causes synchronization data including the frame sync data 420 to be transmitted, via the programmable synchronization link 206 of FIG. 2, from the enabled and configured master panel of the mobile device 200 to the enabled and configured slave panel of the mobile device 200. For example, the synchronization manager 226 of FIG. 2 may cause synchronization data including the frame sync data 420 to be transmitted, via the programmable synchronization link 206, from the second embedded display panel 204 that is enabled and configured as the master panel of the mobile device 200 to the first embedded display panel 202 that is enabled and configured as the slave panel of the mobile device 200.

In some examples, the frame sync data 420 that the synchronization manager 226 of FIG. 2 causes to be transmitted from the master panel to the slave panel during the second time period 414 of FIG. 4 is sufficient (e.g., from a synchronization quality standpoint) to synchronize the slave panel to the master panel. In such examples, the panel timings of the master panel become ungated in response to the transmission of the frame sync data 420 by the master panel, the panel timings of the slave panel become ungated in response to the receipt of the frame sync data 420 at the slave panel, and the ungated panel timings of the slave panel become synchronized to the ungated panel timings of the master panel.

In other examples, the frame sync data 420 may be insufficient (e.g., from a synchronization quality standpoint) to synchronize the slave panel to the master panel, and additional synchronization may accordingly be required. The third time period 416 of the configuration scheme 400 of FIG. 4 corresponds to a vertical active region. The fourth time period 418 of the configuration scheme 400 of FIG. 4 corresponds to a horizontal blanking interval. During the fourth time period 418 of FIG. 4, the synchronization manager 226 of FIG. 2 causes synchronization data including the line sync data 422 to be transmitted, via the programmable synchronization link 206 of FIG. 2, from the enabled and configured master panel of the mobile device 200 to the enabled and configured slave panel of the mobile device 200. For example, the synchronization manager 226 of FIG. 2 may cause synchronization data including the line sync data 422 to be transmitted, via the programmable synchronization link 206, from the second embedded display panel 204 that is enabled and configured as the master panel of the mobile device 200 to the first embedded display panel 202 that is enabled and configured as the slave panel of the mobile device 200.

In some examples, the line sync data 422 that the synchronization manager 226 of FIG. 2 causes to be transmitted from the master panel to the slave panel during the fourth time period 418 of FIG. 4 is sufficient (e.g., from a synchronization quality standpoint) to synchronize the slave panel to the master panel. In such examples, the panel timings of the master panel become ungated in response to the transmission of the line sync data 422 by the master panel, the panel timings of the slave panel become ungated in response to the receipt of the line sync data 422 at the slave panel, and the ungated panel timings of the slave panel become synchronized to the ungated panel timings of the master panel.

The programmable synchronization link 206 of FIG. 2 is implemented to communicate and/or transmit the frame sync data 420 of FIG. 4 from the master panel to the slave panel, and is also implemented to communicate and/or transmit the line sync data 422 of FIG. 4 from the master panel to the slave panel. In some examples, the frame sync data 420 of FIG. 4 may have a first pulse width, and the line sync data 422 of FIG. 4 may have a second pulse width that differs from the first pulse width. In some such examples, the slave panel that is to receive the frame sync data 420 and the line sync data 422 may differentiate the line sync data 422 from the frame sync data 420 based on the differing pulse widths.

Synchronization of the slave may occur by adjusting a pixel clock or by vertical/horizontal blanking extension. Vertical blanking extension is implemented in instances where synchronization is achieved using only the frame sync data 420 of FIG. 4. Horizontal blanking extension is implemented in instances where synchronization is achieved using the line sync data 422 of FIG. 4. As mentioned above, the frame sync data 420 of FIG. 4 transmitted from the master panel to the slave panel may, in some examples, provide sufficient synchronization between the master and slave panels. In such examples, the respective panel timings of the master and slave panels will drift within the frame, and will realign and/or resync at the beginning of the subsequent frame. Synchronizing the master and slave panels in this manner may be viable, for example, when the master and slave panels have an accurate crystal clock. Improved synchronization and/or timing alignment between the master and slave panels may be achieved via the transmission of the above-described line sync data 422 of FIG. 4 from the master panel to the slave panel, which additionally causes the respective panel timings of the master and slave panels to realign and/or resync at every line, as opposed to only at every frame.

Returning to the illustrated example of FIG. 2, the example user interface 214 of FIG. 2 facilitates interactions and/or communications between an end user and the source device 212 and/or, more generally, the mobile device 200. As mentioned above, the user interface 214 includes one or more example input device(s) 228 and one or more example output device(s) 230. Data and/or information that is received via the input device(s) 228 of the user interface 214 and/or presented via the output device(s) 230 of the user interface 214 may be of any type, form and/or format, and may be stored in a non-transitory computer-readable storage medium such as the example memory 216 of FIG. 2 described below.

The example input device(s) 228 of the user interface 214 of FIG. 2 enable the user to input data and/or commands to the mobile device 200 of FIG. 2. For example, the input device(s) 228 may be implemented by and/or as one or more of a button, a switch, a microphone, and/or a touchscreen that enable(s) the user to convey data and/or commands to the example source device 212 of FIG. 2 described above, and/or, more generally, to the mobile device 200 of FIG. 2. In some examples, the data and/or commands conveyed from the user to the user interface 214 via the input device(s) 228 may indicate that one or both of the first and second embedded display panels 202, 204 of the mobile device 200 of FIG. 2 is/are enabled or is/are to become enabled (e.g., enabled to display video data). In some examples, the information, data and/or commands conveyed from the user to the user interface 214 via the input device(s) 228 may indicate that one or both of the first and second embedded display panels 202, 204 of the mobile device 200 of FIG. 2 is/are disabled or is/are to become disabled (e.g., disabled from displaying video data). In some examples, the input device(s) 228 of the user interface 214 may be implemented by the first embedded display panel 202 and/or the second embedded display panel 204 of FIG. 2.

The example output device(s) 230 of the user interface 214 of FIG. 2 present information and/or data in visual and/or audible form to the user. For example, the output device(s) 230 may be implemented by and/or as one or more of a light emitting diode, a touchscreen, and/or a liquid crystal display for presenting visual information (e.g., video data), and/or a speaker for presenting audible information (e.g., audio data associated with video data). In some examples, the output device(s) 230 of the user interface 214 may be implemented by the first embedded display panel 202 and/or the second embedded display panel 204 of FIG. 2.

The example memory 216 of FIG. 2 may be implemented by any type(s) and/or any number(s) of storage device(s) such as a storage drive, a flash memory, a read-only memory (ROM), a random-access memory (RAM), a cache and/or any other physical storage medium in which information is stored for any duration (e.g., for extended time periods, permanently, brief instances, for temporarily buffering, and/or for caching of the information). The information stored in the memory 216 may be stored in any file and/or data structure format, organization scheme, and/or arrangement.

In the illustrated example of FIG. 2, the memory 216 stores the configuration data 234 detected, determined and/or conveyed by the configuration manager 224, and/or the synchronization data 236 (e.g., the frame sync data 420 and/or the line sync data 422 of FIG. 4) detected, determined and/or conveyed by the synchronization manager 226. The memory 216 of FIG. 2 is accessible to the example source device 212 (including the example configuration manager 224 and the synchronization manager 226) and the example user interface 214 (including the example input device(s) 228 and the example output device(s) 230) of FIG. 2, and/or, more generally, to the example mobile device 200 of FIG. 2.

In the illustrated example of FIG. 2, the configuration manager 224 of FIG. 2 described above is a means to configure a first one of the first and second embedded display panels 202, 204 of FIG. 2 as the slave panel of the mobile device 200 of FIG. 2, and to configure a second one of the first and second embedded display panels 202, 204 of FIG. 2 as the master panel of the mobile device 200 of FIG. 2. The configuration manager 224 of FIG. 2 described above is also a means to configure the programmable synchronization link 206 of FIG. 2 to transmit synchronization data from the configured master panel to the configured slave panel. The synchronization manager 226 of FIG. 2 described above is a means to synchronize the first one of the first and second embedded display panels 202, 204 of FIG. 2 configured as the slave panel of the mobile device 200 of FIG. 2 to the second one of the first and second embedded display panels 202, 204 of FIG. 2 configured as the master panel of the mobile device 200 of FIG. 2.

While an example manner of implementing the mobile device 200 is illustrated in FIG. 2, one or more of the elements, processes and/or devices illustrated in FIG. 2 may be combined, divided, re-arranged, omitted, eliminated and/or implemented in any other way. Further, the example first embedded display panel 202, the example second embedded display panel 204, the example programmable synchronization link 206, the example first embedded port 208, the example second embedded port 210, the example source device 212, the example user interface 214, the example memory 216, the example bidirectional GPIO pin 218, the example first input/output interface 220, the example second input/output interface 222, the example configuration manager 224, the example synchronization manager 226, the example input device(s) 228, the example output device(s) 230 and/or, more generally, the example mobile device 200 of FIG. 2 may be implemented by hardware, software, firmware and/or any combination of hardware, software and/or firmware. Thus, for example, any of the example first embedded display panel 202, the example second embedded display panel 204, the example programmable synchronization link 206, the example first embedded port 208, the example second embedded port 210, the example source device 212, the example user interface 214, the example memory 216, the example bidirectional GPIO pin 218, the example first input/output interface 220, the example second input/output interface 222, the example configuration manager 224, the example synchronization manager 226, the example input device(s) 228, the example output device(s) 230 and/or, more generally, the example mobile device 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first embedded display panel 202, the example second embedded display panel 204, the example programmable synchronization link 206, the example first embedded port 208, the example second embedded port 210, the example source device 212, the example user interface 214, the example memory 216, the example bidirectional GPIO pin 218, the example first input/output interface 220, the example second input/output interface 222, the example configuration manager 224, the example synchronization manager 226, the example input device(s) 228, the example output device(s) 230 and/or, more generally, the example mobile device 200 of FIG. 2 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example first embedded display panel 202, the example second embedded display panel 204, the example programmable synchronization link 206, the example first embedded port 208, the example second embedded port 210, the example source device 212, the example user interface 214, the example memory 216, the example bidirectional GPIO pin 218, the example first input/output interface 220, the example second input/output interface 222, the example configuration manager 224, the example synchronization manager 226, the example input device(s) 228, the example output device(s) 230 and/or, more generally, the example mobile device 200 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
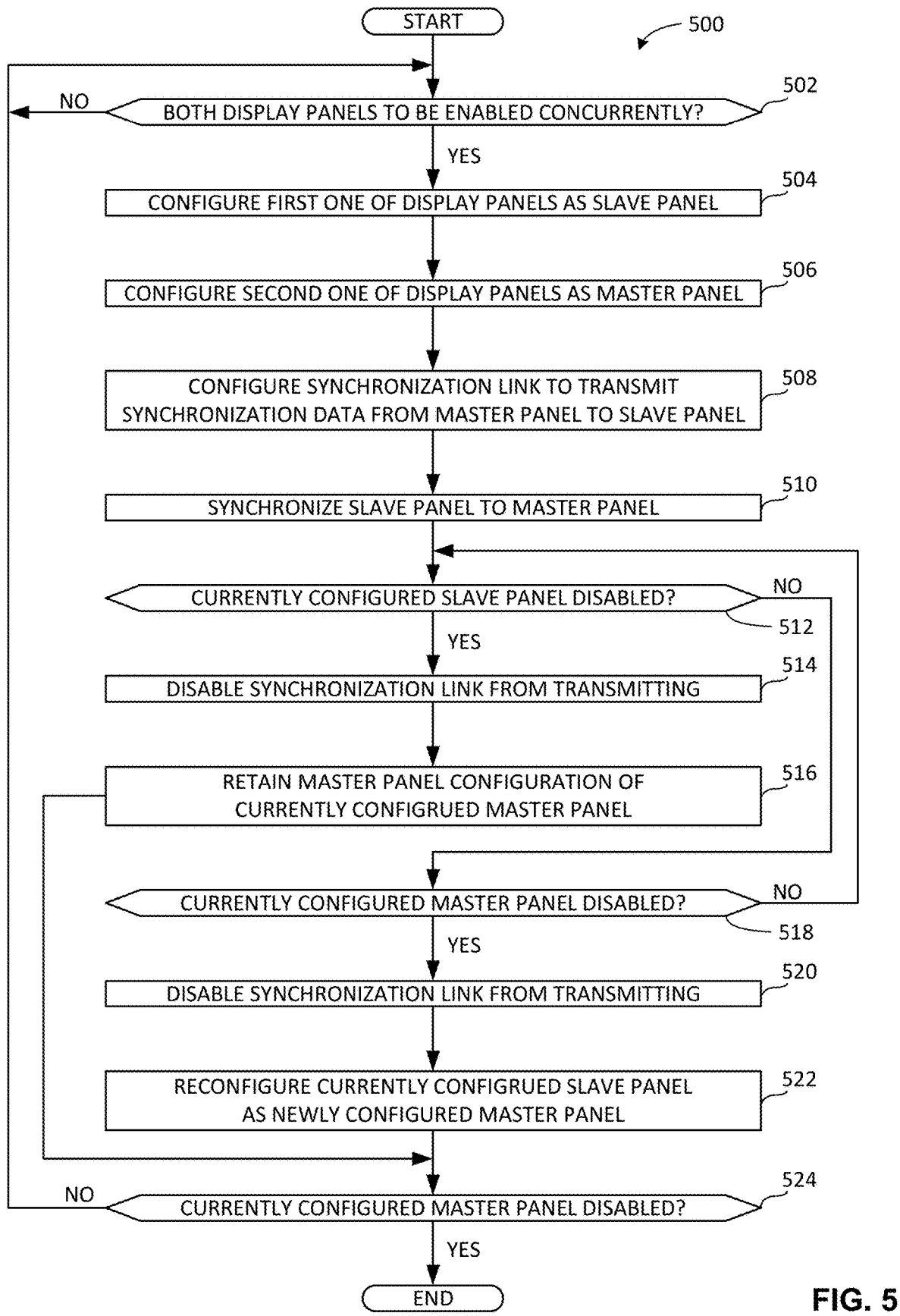
FIG. 5 is a flowchart representative of example machine readable instructions that may be executed at the example mobile device of FIG. 2 to configure and synchronize the example first and second embedded display panels of the example mobile device of FIG. 2.

A flowchart representative of example hardware logic, machine readable instructions, hardware implemented state machines, and/or any combination thereof for implementing the mobile device 200 of FIG. 2 is shown in FIG. 5. The machine readable instructions may be one or more executable program(s) or portion(s) of executable program(s) for execution by a computer processor such as the processor 602 shown in the example processor platform 600 discussed below in connection with FIG. 6. The program(s) may be embodied in software stored on a non-transitory computer-readable storage medium such as a CD-ROM, a floppy disk, a hard drive, a DVD, a Blu-ray disk, or a memory associated with the processor 602, but the entire program(s) and/or parts thereof could alternatively be executed by a device other than the processor 602 and/or embodied in firmware or dedicated hardware. Further, although the example program(s) is/are described with reference to the flowchart illustrated in FIG. 5, many other methods of implementing the example mobile device 200 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 5 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least A, (2) at least B, and (3) at least A and at least B. Similarly, as used herein in the context of describing structures, components, items, objects and/or things, the phrase "at least one of A or B" is intended to refer to implementations including any of (1) at least A, (2) at least B, and (3) at least A and at least B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

FIG. 5 is a flowchart representative of example machine readable instructions 500 that may be executed at the example mobile device 200 of FIG. 2 to configure and synchronize the example first and second embedded display panels 202, 204 of the example mobile device 200 of FIG. 2. The example program 500 begins when the example configuration manager 224 of FIG. 2 determines whether both of the first and second embedded display panels 202, 204 of the mobile device 200 of FIG. 2 are to be enabled concurrently (block 502). If the configuration manager 224 determines at block 502 that both of the first and second embedded display panels 202, 204 of the mobile device 200 are not to be enabled concurrently, control of the example program 500 of FIG. 5 remains at block 502. If the configuration manager 224 instead determines at block 502 that both of the first and second embedded display panels 202, 204 of the mobile device 200 are to be enabled concurrently, control of the example program 500 of FIG. 5 proceeds to block 504.

At block 504, the example configuration manager 224 of FIG. 2 configures a first one of the first and second embedded display panels 202, 204 of the mobile device 200 of FIG. 2 as the slave panel of the mobile device 200 (block 504). For example, the configuration manager 224 may configure the first embedded display panel 202 of the mobile device 200 as the slave panel of the mobile device 200. Following block 504, control of the example program 500 of FIG. 5 proceeds to block 506.

At block 506, the example configuration manager 224 of FIG. 2 configures a second one of the first and second embedded display panels 202, 204 of the mobile device 200 of FIG. 2 as the master panel of the mobile device 200 (block 506). For example, if the configuration manager 224 has configured the first embedded display panel 202 of the mobile device 200 as the slave panel of the mobile device 200 at block 504, the configuration manager 224 may configure the second embedded display panel 204 of the mobile device 200 as the master panel of the mobile device 200 at block 506. Following block 506, control of the example program 500 of FIG. 5 proceeds to block 508.

At block 508, the example configuration manager 224 of FIG. 2 configures the programmable synchronization link 206 of the mobile device 200 of FIG. 2 to transmit synchronization data from the configured master panel of the mobile device 200 to the configured slave panel of the mobile device 200 (block 508). For example, if the configuration manager 224 has configured the first embedded display panel 202 of the mobile device 200 as the slave panel of the mobile device 200 at block 504, and has further configured the second embedded display panel 204 of the mobile device 200 as the master panel of the mobile device 200 at block 506, the configuration manager 224 may configure the programmable synchronization link 206 to transmit synchronization data from the second embedded display panel 204 (e.g., configured as the master panel) to the first embedded display panel 202 (e.g., configured as the slave panel). Following block 508, control of the example program 500 of FIG. 5 proceeds to block 510.

At block 510, the example synchronization manager 226 of FIG. 2 synchronizes the configured slave panel of the mobile device 200 of FIG. 2 to the configured master panel of the mobile device 200 of FIG. 2. For example, the synchronization manager 226 may synchronize the first embedded display panel 202 of FIG. 2 configured as the slave panel to the second embedded display panel 204 of FIG. 2 configured as the master panel. In some examples, the synchronization manager 226 synchronizes the configured slave panel to the configured master panel by transmitting synchronization data from the configured master panel to the configured slave panel via the configured programmable synchronization link 206 of FIG. 2. In some examples, the synchronization data may include frame sync data to be transmitted during a vertical blanking interval (e.g., the second time period 414 of FIG. 4). In some examples, the synchronization data may include line sync data to be transmitted during a horizontal blanking interval (e.g., the fourth time period 418 of FIG. 4). Following block 510, control of the example program 500 of FIG. 5 proceeds to block 512.

At block 512, the example configuration manager 224 of FIG. 2 determines whether the embedded display panel that is currently configured as the slave panel of the mobile device 200 of FIG. 2 has become disabled (block 512). For example, the configuration manager 224 may determine that the first embedded display panel 202 that is currently configured as the slave panel of the mobile device 200 has become disabled. If the configuration manager 224 determines at block 512 that the embedded display panel that is currently configured as the slave panel of the mobile device 200 has become disabled, control of the example program 500 of FIG. 5 proceeds to block 514. If the configuration manager 224 instead determines at block 512 that the embedded display panel that is currently configured as the slave panel of the mobile device 200 has not become disabled, control of the example program 500 of FIG. 5 proceeds to block 518.

At block 514, the example configuration manager 224 of FIG. 2 disables the programmable synchronization link 206 of FIG. 2 (block 514). For example, the configuration manager 224 may disable the programmable synchronization link 206 such that the programmable synchronization link 206 is no longer able to transmit synchronization data from the second embedded display panel 204 (e.g., configured as the master panel) to the first embedded display panel 202 (e.g., configured as the slave panel). Following block 514, control of the example program 500 of FIG. 5 proceeds to block 516.

At block 516, the example configuration manager 224 of FIG. 2 retains the master panel configuration of the embedded display panel that is currently configured as the master panel of the mobile device 200 of FIG. 2 (block 516). For example, the configuration manager 224 may retain the master panel configuration of the second embedded display panel 204 that is currently configured as the master panel of the mobile device 200. Following block 516, control of the example program 500 of FIG. 5 proceeds to block 524.

At block 518, the example configuration manager 224 of FIG. 2 determines whether the embedded display panel that is currently configured as the master panel of the mobile device 200 of FIG. 2 has become disabled (block 518). For example, the configuration manager 224 may determine that the second embedded display panel 204 that is currently configured as the master panel of the mobile device 200 has become disabled. If the configuration manager 224 determines at block 518 that the embedded display panel that is currently configured as the master panel of the mobile device 200 has become disabled, control of the example program 500 of FIG. 5 proceeds to block 520. If the configuration manager 224 instead determines at block 518 that the embedded display panel that is currently configured as the master panel of the mobile device 200 has not become disabled, control of the example program 500 of FIG. 5 returns to block 512.

At block 520, the example configuration manager 224 of FIG. 2 disables the programmable synchronization link 206 of FIG. 2 (block 520). For example, the configuration manager 224 may disable the programmable synchronization link 206 such that the programmable synchronization link 206 is no longer able to transmit synchronization data from the second embedded display panel 204 (e.g., configured as the master panel) to the first embedded display panel 202 (e.g., configured as the slave panel). Following block 520, control of the example program 500 of FIG. 5 proceeds to block 522.

At block 522, the example configuration manager 224 of FIG. 2 reconfigures the embedded display panel that is currently configured as the slave panel of the mobile device 200 of FIG. 2 as the newly configured master panel of the mobile device 200 (block 522). For example, the configuration manager 224 may reconfigure the first embedded display panel 202 that is currently configured as the slave panel of the mobile device 200 to be the newly configured master panel of the mobile device 200. Following block 522, control of the example program 500 of FIG. 5 proceeds to block 524.

At block 524, the example configuration manager 224 of FIG. 2 determines whether the embedded display panel that is currently configured as the master panel of the mobile device 200 of FIG. 2 has become disabled (block 524). For example, the configuration manager 224 may determine that the first embedded display panel 202 that is currently configured as the master panel of the mobile device 200 has become disabled. As another example, the configuration manager 224 may determine that the second embedded display panel 204 that is currently configured as the master panel of the mobile device 200 has become disabled. If the configuration manager 224 determines at block 524 that the embedded display panel that is currently configured as the master panel of the mobile device 200 has not become disabled, control of the example program 500 of FIG. 5 returns to block 502. If the configuration manager 224 instead determines at block 524 that the embedded display panel that is currently configured as the master panel of the mobile device 200 has become disabled, the example program 500 of FIG. 5 ends.

Figure 6:
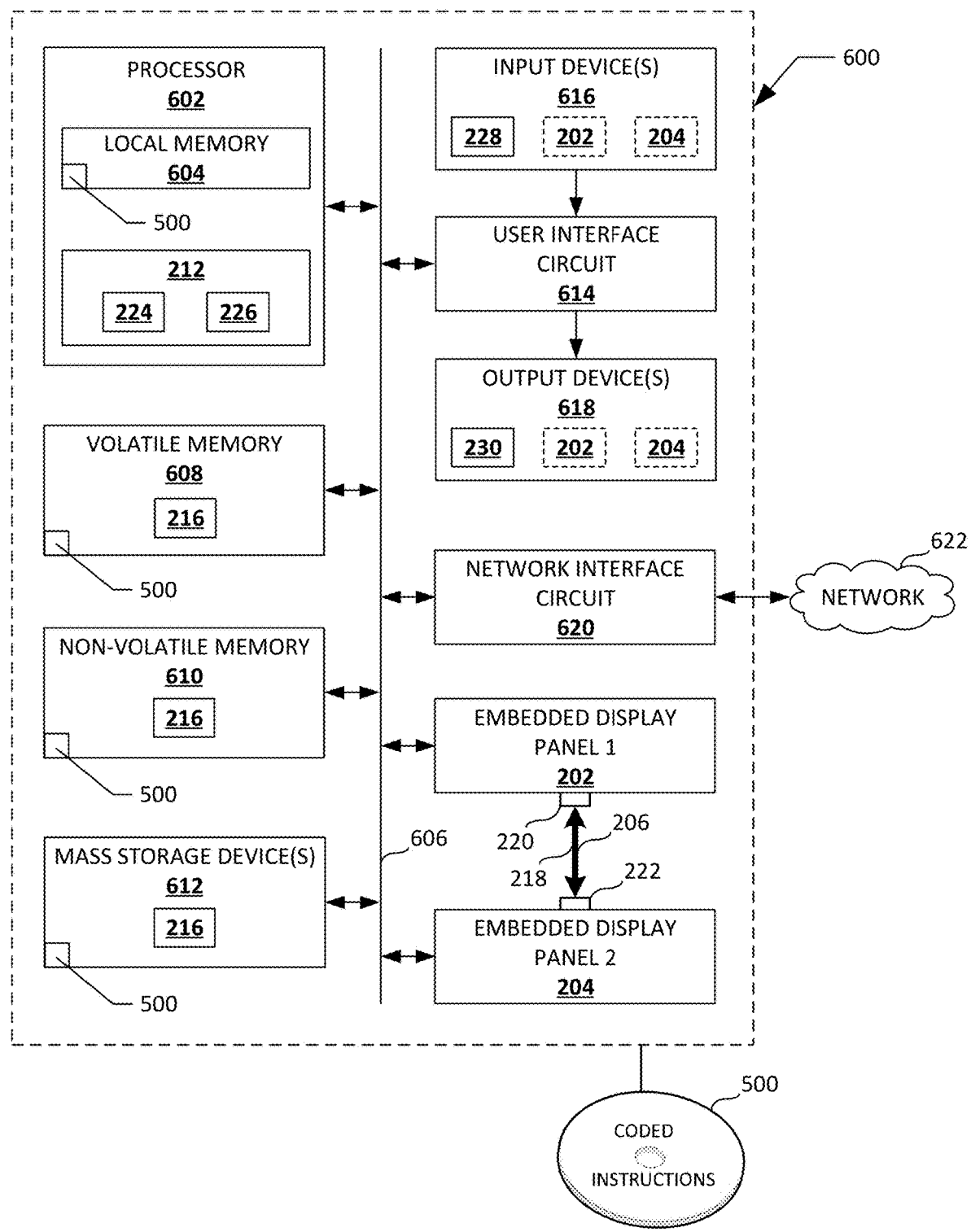
FIG. 6 is an example processor platform capable of executing the example instructions of FIG. 5 to implement the example mobile device of FIG. 2.

FIG. 6 is a block diagram of an example processor platform 600 structured to execute the example instructions 500 of FIG. 5 to implement the example mobile device 200 of FIG. 2. The processor platform 600 can be, for example, a smartphone, a tablet, a laptop, a personal digital assistant (PDA), a wearable device, etc., or any other type of mobile computing device.

The processor platform 600 of the illustrated example includes a processor 602. The processor 602 of the illustrated example is hardware. For example, the processor 602 can be implemented by one or more integrated circuits, logic circuits, microprocessors, GPUs, DSPs, or controllers from any desired family or manufacturer. The hardware processor may be a semiconductor based (e.g., silicon based) device. The processor 602 of the illustrated example includes a local memory 604 (e.g., a cache). In the illustrated example, the processor 602 implements the example source device 212, the example configuration manager 224, and the example synchronization manager 226 of FIG. 2.

The processor 602 of FIG. 6 is in communication with the example first embedded display panel 202 of FIG. 2 via a bus 606, and is also in communication with the example second embedded display panel 204 of FIG. 2 via the bus 606. In the illustrated example, the first and second embedded display panels 202, 204 are operatively coupled to one another via the example programmable synchronization link 206 (e.g., including the example bidirectional GPIO pin 218, the example first input/output interface 220, and the example second input/output interface 222) of FIG. 2.

The processor 602 of the illustrated example is also in communication with a main memory including a volatile memory 608 and a non-volatile memory 610 via the bus 606. The volatile memory 608 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 610 may be implemented by flash memory and/or any other desired type of memory device. Access to the main memory 608, 610 is controlled by a memory controller. In this example, the main memory 608, 610 implements the example memory 216 of FIG. 2.

The processor platform 600 of the illustrated example also includes one or more mass storage device(s) 612 for storing software and/or data. Examples of such mass storage devices 612 include floppy disk drives, hard drive disks, compact disk drives, Blu-ray disk drives, redundant array of independent disks (RAID) systems, and digital versatile disk (DVD) drives. In the illustrated example of FIG. 6, the mass storage device(s) 612 implement(s) the example memory 216 of FIG. 2.

The processor platform 600 of the illustrated example also includes a user interface circuit 614. The user interface circuit 614 may be implemented by any type of interface standard, such as an Ethernet interface, a universal serial bus (USB), a Bluetooth® interface, a near field communication (NFC) interface, and/or a PCI express interface.

In the illustrated example, one or more input device(s) 616 are connected to the user interface circuit 614. The input device(s) 616 permit(s) a user to enter data and/or commands into the processor 602. The input device(s) can be implemented by, for example, an audio sensor, a microphone, a camera (still or video), a keyboard, a button, a mouse, a touchscreen, a track-pad, a trackball, isopoint and/or a voice recognition system. In the illustrated example of FIG. 6, the input devices 616 include the example input device(s) 228 of FIG. 2, and may further include the first embedded display panel 202 and/or the example second embedded display panel 204 of FIG. 2.

One or more output device(s) 618 are also connected to the user interface circuit 614 of the illustrated example. The output device(s) 618 can be implemented, for example, by display devices (e.g., a light emitting diode (LED), an organic light emitting diode (OLED), a liquid crystal display (LCD), a touchscreen, etc.), a tactile output device, and/or speaker. The user interface circuit 614 of the illustrated example, thus, typically includes a graphics driver card, a graphics driver chip and/or a graphics driver processor. In the illustrated example of FIG. 6, the output devices 618 include the example output device(s) 230 of FIG. 2, and may further include the first embedded display panel 202 and/or the example second embedded display panel 204 of FIG. 2.

The processor platform 600 of the illustrated example also includes a network interface circuit 620. The network interface circuit 620 may be implemented by any type of interface standard, such as an Ethernet interface, a universal serial bus (USB), a Bluetooth® interface, a near field communication (NFC) interface, and/or a PCI express interface. The network interface circuit 620 of the illustrated example includes a communication device such as a transmitter, a receiver, a transceiver, a modem, a residential gateway, a wireless access point, and/or a network interface to facilitate exchange of data with external machines (e.g., computing devices of any kind) via a network 622. The communication can be via, for example, an Ethernet connection, a digital subscriber line (DSL) connection, a telephone line connection, a coaxial cable system, a satellite system, a line-of-site wireless system, a cellular telephone system, a wireless local area network (WLAN), etc.

The machine executable instructions 500 of FIG. 5 may be stored in the volatile memory 608, in the non-volatile memory 610, in the mass storage device(s) 612, and/or on a removable non-transitory computer-readable storage medium such as a CD or DVD.

From the foregoing, it will be appreciated that methods and apparatus have been disclosed for synchronizing embedded display panels of mobile devices via programmable synchronization links. More specifically, the disclosed methods and apparatus advantageously synchronize first and second embedded display panels of a mobile device via a programmable synchronization link of the mobile device that extends between and/or is operatively coupled to the first and second embedded display panels. The first and second embedded display panels are respectively configurable as either a master panel or a slave panel. For example, one of the first and second embedded display panels may be configured as a slave panel of the mobile device, and the other one of the first and second embedded display panels may be configured as the master panel of the mobile device. The programmable synchronization link of the mobile device is bidirectional, and may advantageously be configured to transmit synchronization data from the one of the first and second embedded display panels that is configured as the master panel of the mobile device to the other one of the first and second embedded display panels that is configured as the slave panel of the mobile device.

The disclosed methods and apparatus may be implemented in connection with mobile devices having two or more MIPI DSI Command Mode display panels that require synchronization, and may also be implemented in connection with mobile devices having two or more eDP display panels that require synchronization. When implemented in connection with such mobile devices, the disclosed methods and apparatus reduce (e.g., minimize or eliminate) synchronization issues such as lag, and advantageously provide for an improved user experience in relation to the mobile device, particularly in instances where one or more user(s) of the mobile device is/are viewing video data that is being displayed and/or presented concurrently (e.g., simultaneously) on two or more of the embedded display panels of the mobile device. The disclosed methods and apparatus are accordingly directed to one or more improvement(s) in the functioning of a mobile device.

In some examples, a mobile device is disclosed. In some disclosed examples, the mobile device comprises a first embedded display panel, a second embedded display panel, a programmable synchronization link, a configuration manager, and a synchronization manager. In some disclosed examples the programmable synchronization link is operatively coupled to the first and second embedded display panels. In some disclosed examples, the configuration manager is to configure the first embedded display panel as a slave panel, and is further to configure the second embedded display panel as a master panel. In some disclosed examples the synchronization manager is to synchronize the slave panel to the master panel via the programmable synchronization link.

In some disclosed examples, the programmable synchronization link includes a first input/output interface associated with the first embedded display panel, a second input/output interface associated with the second embedded display panel, and a bidirectional general-purpose input/output pin extending between the first and second input/output interfaces.

In some disclosed examples, the configuration manager is further to configure the programmable synchronization link to transmit synchronization data from the master panel to the slave panel. In some disclosed examples, the synchronization manager is to synchronize the slave panel to the master panel based on the synchronization data. In some disclosed examples, the synchronization data includes frame sync data to be transmitted via the programmable synchronization link during a vertical blanking interval. In some disclosed examples, the synchronization data includes line sync data to be transmitted via the programmable synchronization link during a horizontal blanking interval.

In some disclosed examples, the synchronization manager is to synchronize the slave panel to the master panel in response to the configuration manager configuring the second embedded display panel as the master panel.

In some disclosed examples, the configuration manager is to configure the first and second embedded display panels in response to a command received via an input device of a user interface of the mobile device. In some disclosed examples, the input device is the first embedded display panel or the second embedded display panel.

In some disclosed examples, the configuration manager is further to determine whether the second embedded display panel currently configured as the master panel becomes disabled while the first embedded display panel currently configured as the slave panel remains enabled. In some disclosed examples, in response to determining that the second embedded display panel currently configured as the master panel becomes disabled while the first embedded display panel currently configured as the slave panel remains enabled, the configuration manager is further to reconfigure the first embedded display panel as a new master panel.

In some examples, a non-transitory computer-readable storage medium comprising instructions is disclosed. In some disclosed examples, the instructions, when executed, cause one or more processors to configure a first embedded display panel of a mobile device as a slave panel. In some disclosed examples, the instructions, when executed, further cause the one or more processors to configure a second embedded display panel of a mobile device as a master panel. In some disclosed examples, the instructions, when executed, further cause the one or more processors to synchronize the slave panel to the master panel via a programmable synchronization link operatively coupled to the first and second embedded display panels.

In some disclosed examples, the programmable synchronization link includes a first input/output interface associated with the first embedded display panel, a second input/output interface associated with the second embedded display panel, and a bidirectional general-purpose input/output pin extending between the first and second input/output interfaces.

In some disclosed examples, the instructions, when executed, further cause the one or more processors to configure the programmable synchronization link to transmit synchronization data from the master panel to the slave panel. In some disclosed examples, the slave panel is to be synchronized to the master panel based on the synchronization data. In some disclosed examples, the synchronization data includes frame sync data to be transmitted via the programmable synchronization link during vertical blanking interval. In some disclosed examples, the synchronization data includes line sync data to be transmitted via the programmable synchronization link during a horizontal blanking interval.

In some disclosed examples, the instructions, when executed, cause the one or more processors to synchronize the slave panel to the master panel in response to the second embedded display panel being configured as the master panel.

In some disclosed examples, the instructions, when executed, cause the one or more processors to configure the first and second embedded display panels in response to a command received via an input device of a user interface of the mobile device. In some disclosed examples, the input device is the first embedded display panel or the second embedded display panel.

In some disclosed examples, the instructions, when executed, further cause the one or more processors to determine whether the second embedded display panel currently configured as the master panel becomes disabled while the first embedded display panel currently configured as the slave panel remains enabled. In some disclosed examples, the instructions, when executed, further cause the one or more processors, in response to determining that the second embedded display panel currently configured as the master panel becomes disabled while the first embedded display panel currently configured as the slave panel remains enabled, to reconfigure the first embedded display panel as a new master panel.

In some examples, a method is disclosed. In some disclosed examples, the method comprises configuring, by executing a computer-readable instruction with one or more processors, a first embedded display panel of a mobile device as a slave panel. In some disclosed examples, the method further comprises configuring, by executing a computer-readable instruction with the one or more processors, a second embedded display panel of the mobile device as a master panel. In some disclosed examples, the method further comprises synchronizing, by executing a computer-readable instruction with the one or more processors, the slave panel to the master panel via a programmable synchronization link operatively coupled to the first and second embedded display panels.

In some disclosed examples of the method, the programmable synchronization link includes a first input/output interface associated with the first embedded display panel, a second input/output interface associated with the second embedded display panel, and a bidirectional general-purpose input/output pin extending between the first and second input/output interfaces.

In some disclosed examples, the method further includes configuring, by executing a computer-readable instruction with the one or more processors, the programmable synchronization link to transmit synchronization data from the master panel to the slave panel. In some disclosed examples, the slave panel is to be synchronized to the master panel based on the synchronization data. In some disclosed examples, the synchronization data includes frame sync data to be transmitted via the programmable synchronization link during a vertical blanking interval. In some disclosed examples, the synchronization data includes line sync data to be transmitted via the programmable synchronization link during a horizontal blanking interval.

In some disclosed examples of the method, the synchronizing of the slave panel to the master panel occurs in response to the configuring of the second embedded display panel as the master panel.

In some disclosed examples of the method, the configuring of the first and second embedded display panels occurs in response to a command received via an input device of a user interface of the mobile device. In some disclosed examples, the input device is the first embedded display panel or the second embedded display panel.

In some disclosed examples, the method further includes determining whether the second embedded display panel currently configured as the master panel becomes disabled while the first embedded display panel currently configured as the slave panel remains enabled. In some disclosed examples, the method further includes, in response to determining that the second embedded display panel currently configured as the master panel becomes disabled while the first embedded display panel currently configured as the slave panel remains enabled, reconfiguring the first embedded display panel as a new master panel.

In some examples, a mobile device is disclosed. In some disclosed examples, the mobile device comprises a first embedded display panel, a second embedded display panel, a programmable synchronization link, configuration means, and synchronization means. In some disclosed examples, the programmable synchronization link is operatively coupled to the first and second embedded display panels. In some disclosed examples, the configuration manager is for configuring the first embedded display panel as a slave panel, and is further for configuring the second embedded display panels as a master panel. In some disclosed examples, the synchronization means is for synchronizing the slave panel to the master panel via the programmable synchronization link.

In some disclosed examples, the programmable synchronization link includes a first input/output interface associated with the first embedded display panel, a second input/output interface associated with the second embedded display panel, and a bidirectional general-purpose input/output pin extending between the first and second input/output interfaces.

In some disclosed examples, the configuration means is further for configuring the programmable synchronization link to transmit synchronization data from the master panel to the slave panel. In some disclosed examples, the synchronization means is to synchronize the slave panel to the master panel based on the synchronization data. In some disclosed examples, the synchronization data includes frame sync data to be transmitted via the programmable synchronization link during a vertical blanking interval. In some disclosed examples, the synchronization data includes line sync data to be transmitted via the programmable synchronization link during a horizontal blanking interval.

In some disclosed examples, the synchronization means is to synchronize the slave panel to the master panel in response to the configuration means configuring the second embedded display panel as the master panel.

In some disclosed examples, the configuration means is to configure the first and second embedded display panels in response to a command received via an input device of a user interface of the mobile device. In some disclosed examples, the input device is the first embedded display panel or the second embedded display panel.

In some disclosed examples, the configuration means is further for determining whether the second embedded display panel currently configured as the master panel becomes disabled while the first embedded display panel currently configured as the slave panel remains enabled. In some disclosed examples, in response to determining that the second embedded display panel currently configured as the master panel becomes disabled while the first embedded display panel currently configured as the slave panel remains enabled, the configuration means is to reconfigure the first embedded display panel as a new master panel.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A mobile device comprising:
   a first embedded display panel;

a second embedded display panel;
a programmable synchronization link operatively coupled to the first and second embedded display panels;
a configuration manager to:
  configure the first embedded display panel as a slave panel; and
  configure the second embedded display panel as a master panel subsequent to the first embedded display panel being configured as the slave panel; and
a synchronization manager to synchronize the slave panel to the master panel via the programmable synchronization link.

2. A mobile device as defined in claim 1, wherein the programmable synchronization link includes a first input/output interface associated with the first embedded display panel, a second input/output interface associated with the second embedded display panel, and a bidirectional general-purpose input/output pin extending between the first and second input/output interfaces.

3. A mobile device as defined in claim 1, wherein the configuration manager is further to configure the programmable synchronization link to transmit synchronization data from the master panel to the slave panel, the synchronization manager to synchronize the slave panel to the master panel based on the synchronization data.

4. A mobile device as defined in claim 3, wherein the synchronization data includes frame sync data to be transmitted via the programmable synchronization link during a vertical blanking interval.

5. A mobile device as defined in claim 4, wherein the synchronization data includes line sync data to be transmitted via the programmable synchronization link during a horizontal blanking interval.

6. A mobile device as defined in claim 1, wherein the synchronization manager is to synchronize the slave panel to the master panel in response to the configuration manager configuring the second embedded display panel as the master panel.

7. A mobile device as defined in claim 1, wherein the configuration manager is to configure the first and second embedded display panels in response to a command received via an input device of a user interface of the mobile device.

8. A mobile device as defined in claim 7, wherein the input device is the first embedded display panel or the second embedded display panel.

9. A mobile device as defined in claim 1, wherein the configuration manager is further to determine whether the second embedded display panel currently configured as the master panel becomes disabled while the first embedded display panel currently configured as the slave panel remains enabled.

10. A mobile device as defined in claim 9, wherein, in response to determining that the second embedded display panel currently configured as the master panel becomes disabled while the first embedded display panel currently configured as the slave panel remains enabled, the configuration manager is further to reconfigure the first embedded display panel as a new master panel.

11. A non-transitory computer-readable storage medium comprising instructions that, when executed, cause one or more processors to at least:
  configure a first embedded display panel of a mobile device as a slave panel;
  configure a second embedded display panel of the mobile device as a master panel subsequent to the first embedded display panel being configured as the slave panel; and
  synchronize the slave panel to the master panel via a programmable synchronization link operatively coupled to the first and second embedded display panels.

12. A non-transitory computer-readable storage medium as defined in claim 11, wherein the programmable synchronization link includes a first input/output interface associated with the first embedded display panel, a second input/output interface associated with the second embedded display panel, and a bidirectional general-purpose input/output pin extending between the first and second input/output interfaces.

13. A non-transitory computer-readable storage medium as defined in claim 11, wherein the instructions, when executed, further cause the one or more processors to configure the programmable synchronization link to transmit synchronization data from the master panel to the slave panel, the slave panel to be synchronized to the master panel based on the synchronization data.

14. A non-transitory computer-readable storage medium as defined in claim 13, wherein the synchronization data includes frame sync data to be transmitted via the programmable synchronization link during a vertical blanking interval.

15. A non-transitory computer-readable storage medium as defined in claim 14, wherein the synchronization data includes line sync data to be transmitted via the programmable synchronization link during a horizontal blanking interval.

16. A method comprising:
  configuring, by executing a computer-readable instruction with one or more processors, a first embedded display panel of a mobile device as a slave panel;
  configuring, by executing a computer-readable instruction with the one or more processors, a second embedded display panel of the mobile device as a master panel after the first embedded display panel is configured as the slave panel; and
  synchronizing, by executing a computer-readable instruction with the one or more processors, the slave panel to the master panel via a programmable synchronization link operatively coupled to the first and second embedded display panels.

17. A method as defined in claim 16, wherein the programmable synchronization link includes a first input/output interface associated with the first embedded display panel, a second input/output interface associated with the second embedded display panel, and a bidirectional general-purpose input/output pin extending between the first and second input/output interfaces.

18. A method as defined in claim 16, further including configuring, by executing a computer-readable instruction with the one or more processors, the programmable synchronization link to transmit synchronization data from the master panel to the slave panel, the slave panel to be synchronized to the master panel based on the synchronization data.

19. A method as defined in claim 18, wherein the synchronization data includes frame sync data to be transmitted via the programmable synchronization link during a vertical blanking interval.

20. A method as defined in claim 19, wherein the synchronization data includes line sync data to be transmitted via the programmable synchronization link during a horizontal blanking interval.

* * * * *